(12) United States Patent
Williams

(10) Patent No.: US 8,899,456 B2
(45) Date of Patent: Dec. 2, 2014

(54) BICYCLE CARRIER

(76) Inventor: Marty Williams, Colorado Springs, CO (US)

( * ) Notice: Subject to any disclaimer, the term of this patent is extended or adjusted under 35 U.S.C. 154(b) by 228 days.

(21) Appl. No.: 11/697,294

(22) Filed: Apr. 5, 2007

(65) Prior Publication Data

US 2011/0240700 A1    Oct. 6, 2011

(51) Int. Cl.
    *B60R 9/10*    (2006.01)
(52) U.S. Cl.
    CPC ............... *B60R 9/10* (2013.01); *Y10S 224/924* (2013.01)
    USPC ........................... 224/501; 224/510; 224/924
(58) Field of Classification Search
    CPC ....................................................... B60R 9/10
    USPC ............... 224/501, 510, 519, 521, 528, 924; 211/17–18, 22
    See application file for complete search history.

(56) References Cited

U.S. PATENT DOCUMENTS

| | | | | | |
|---|---|---|---|---|---|
| 640,736 | A | * | 1/1900 | Biester | 211/19 |
| 3,204,839 | A | * | 9/1965 | Hyman Yuda et al. | 224/324 |
| 5,067,641 | A | * | 11/1991 | Johnson et al. | 224/501 |
| 5,096,102 | A | * | 3/1992 | Tolson | 224/513 |
| 5,181,222 | A | * | 1/1993 | Duarte | 372/53 |
| 5,181,822 | A | * | 1/1993 | Allsop et al. | 414/462 |
| 5,373,978 | A | * | 12/1994 | Buttchen et al. | 224/510 |
| 5,497,927 | A | * | 3/1996 | Peterson | 224/519 |
| 5,820,004 | A | * | 10/1998 | Lane | 224/485 |
| 5,950,892 | A | * | 9/1999 | Tsai | 224/520 |
| 6,089,428 | A | * | 7/2000 | Wagner | 224/401 |
| 6,491,195 | B1 | * | 12/2002 | McLemore et al. | 224/537 |
| 6,662,983 | B2 | * | 12/2003 | Lane et al. | 224/405 |
| 6,695,185 | B2 | * | 2/2004 | Church | 224/521 |
| 2004/0256430 | A1 | * | 12/2004 | Wang | 224/520 |
| 2006/0029483 | A1 | * | 2/2006 | Allen et al. | 410/30 |
| 2008/0164292 | A1 | * | 7/2008 | Farney | 224/324 |
| 2012/0000952 | A1 | * | 1/2012 | Dreger et al. | 224/533 |
| 2012/0027560 | A1 | * | 2/2012 | Olsen | 414/800 |

FOREIGN PATENT DOCUMENTS

| | | | | |
|---|---|---|---|---|
| DE | 3900569 | A1 | * | 7/1990 |
| GB | 2182619 | A | * | 5/1987 |
| GB | 2235909 | A | * | 3/1991 |
| GB | 2363772 | A | * | 1/2002 |

\* cited by examiner

*Primary Examiner* — Brian D Nash
*Assistant Examiner* — John Cogill
(74) *Attorney, Agent, or Firm* — Tracy M. Heims; Apex Juris, pllc

(57) ABSTRACT

A lightweight bicycle carrier that is easily adjustable to accommodate a wide variety of sizes and shapes of bicycles and other equipment. The bicycle carrier of the present invention is easily assembled and installed onto the hitch receiver of a vehicle. The bicycle carrier can also be partially disassembled to allow access into the rear of the vehicle without interfering with the vehicle tailgate. The bicycle carrier includes adjustable angular support arms to support bicycles during transport.

24 Claims, 13 Drawing Sheets

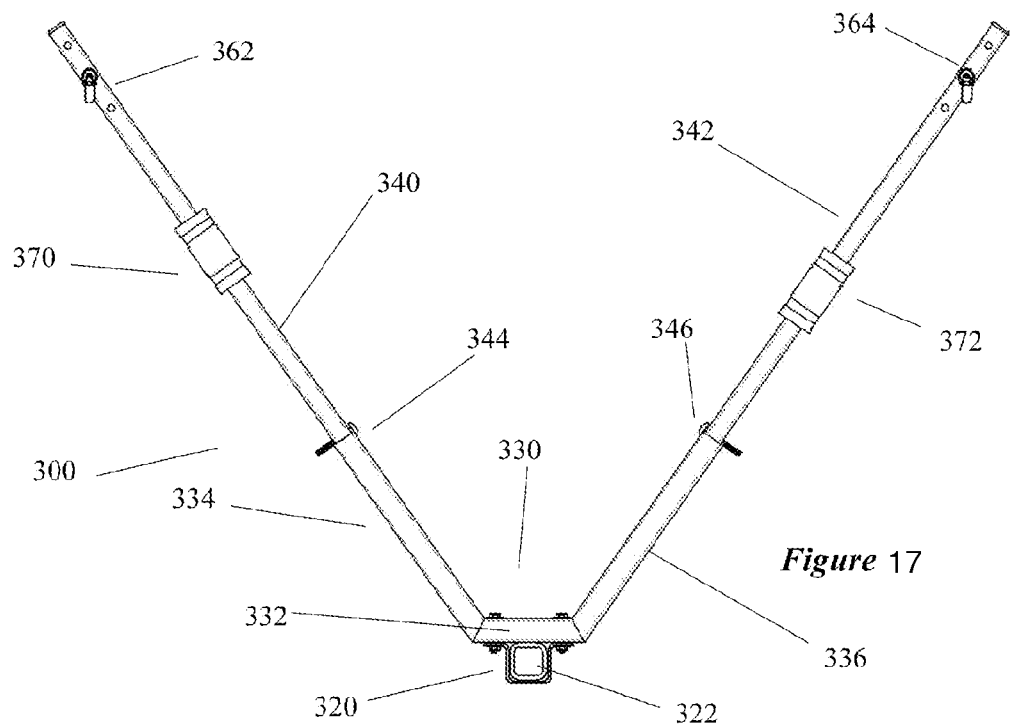
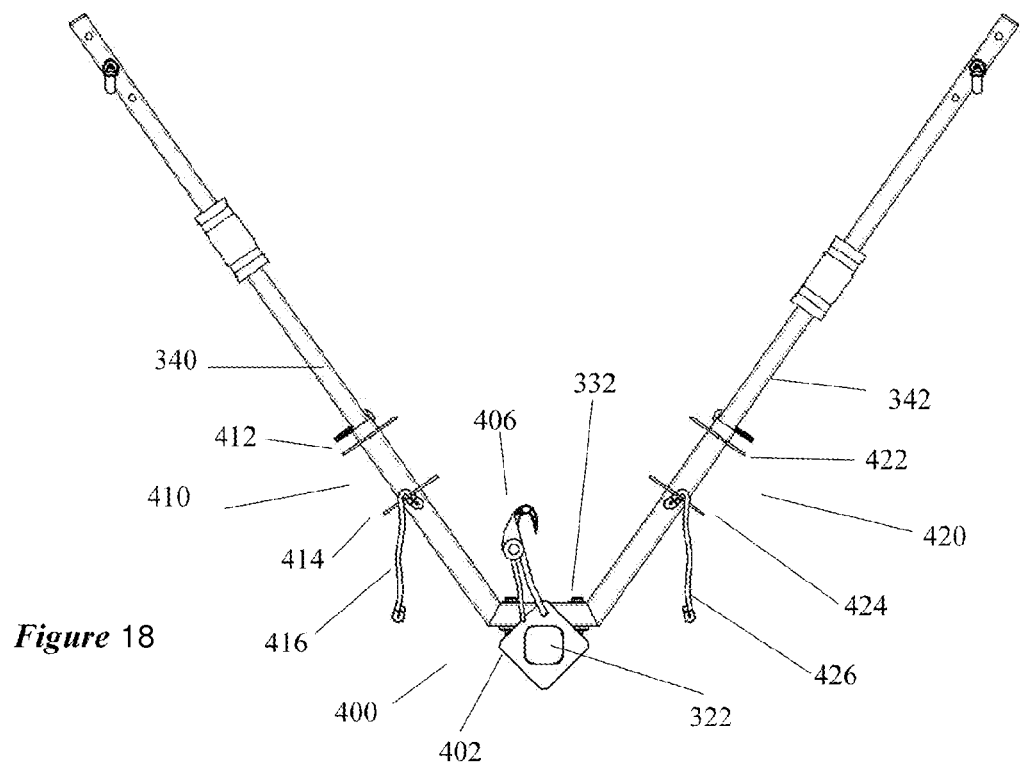

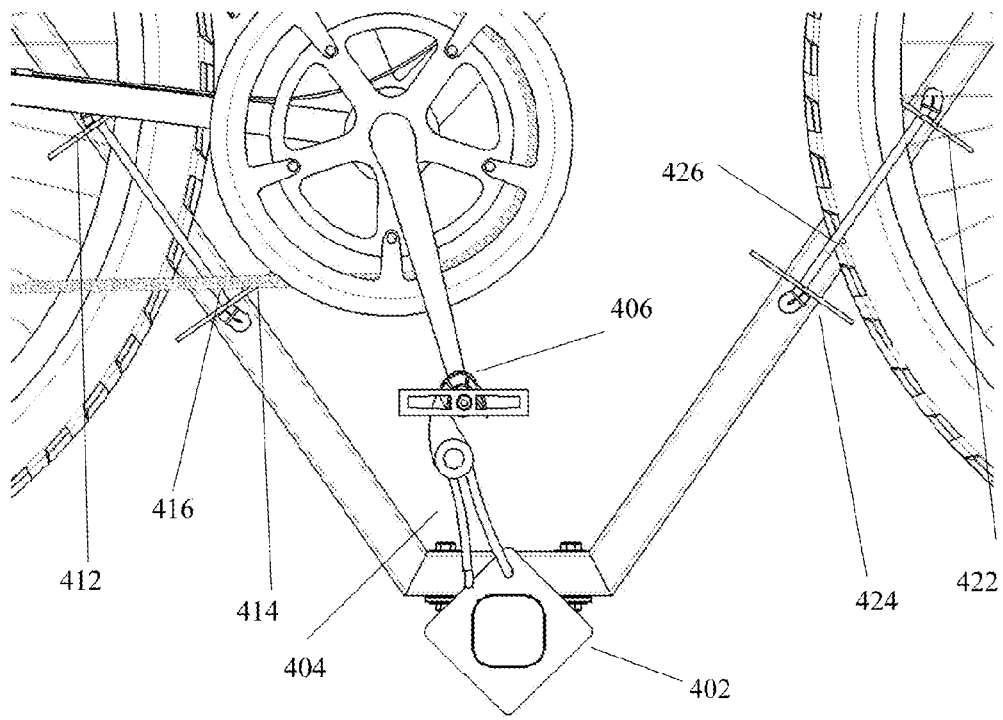
*Figure* 19
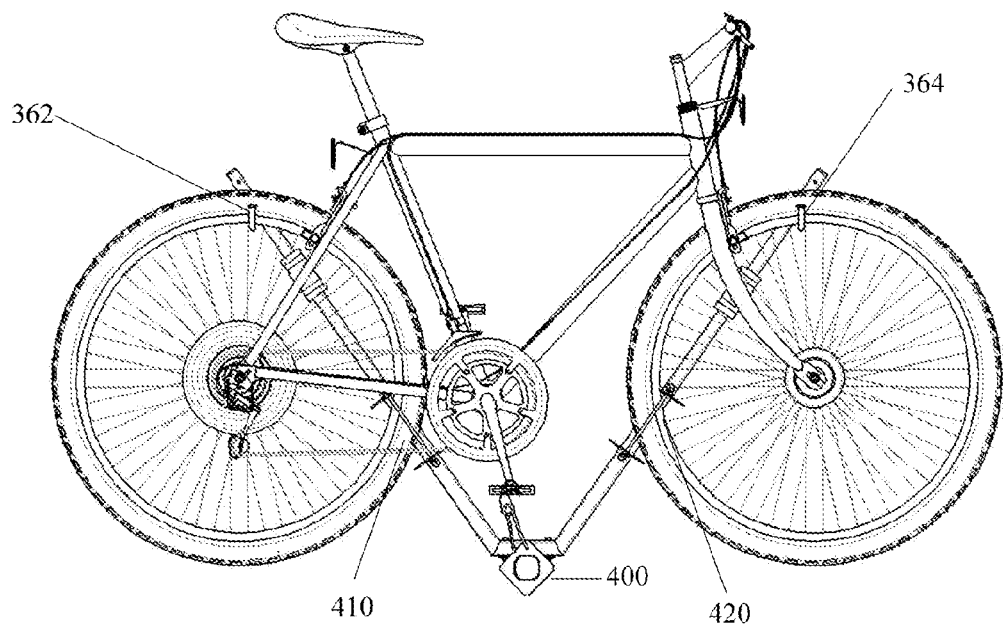
*Figure* 20

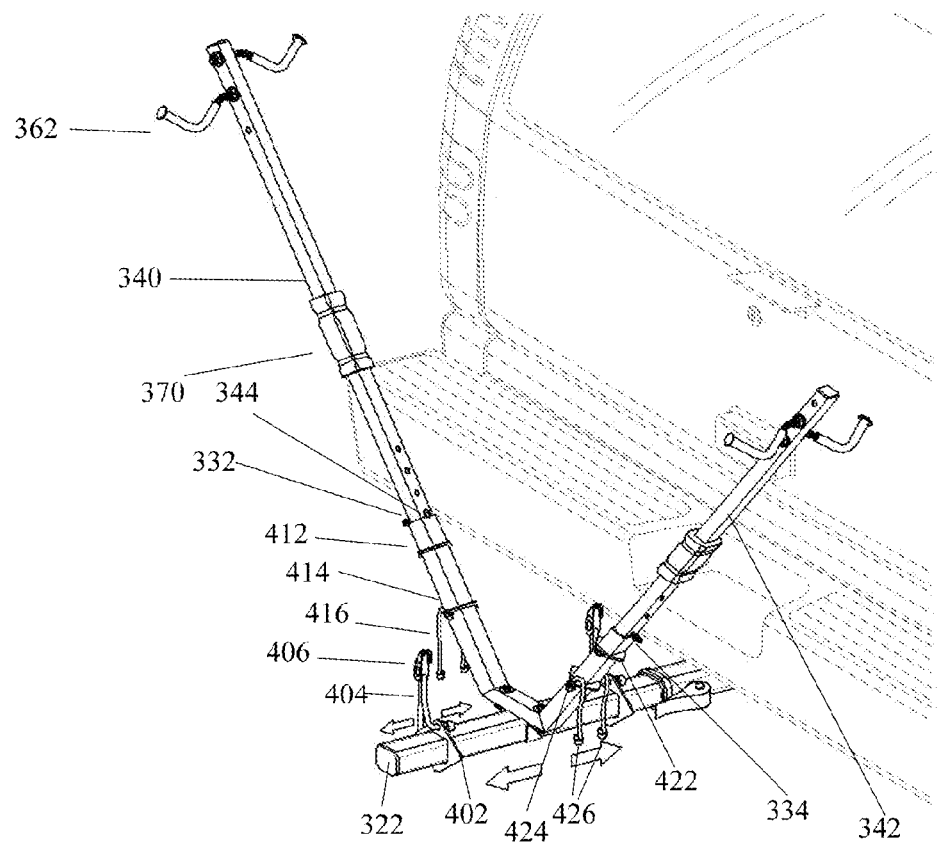
*Figure* 21
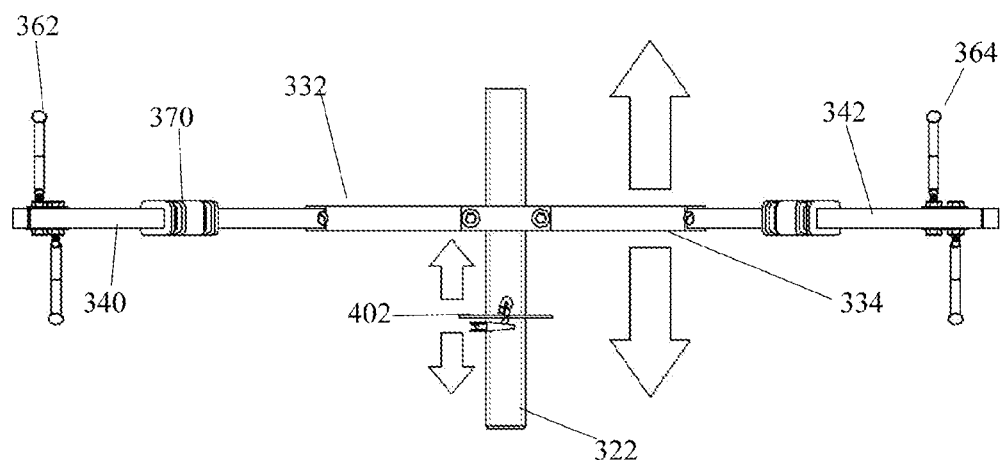
*Figure* 22

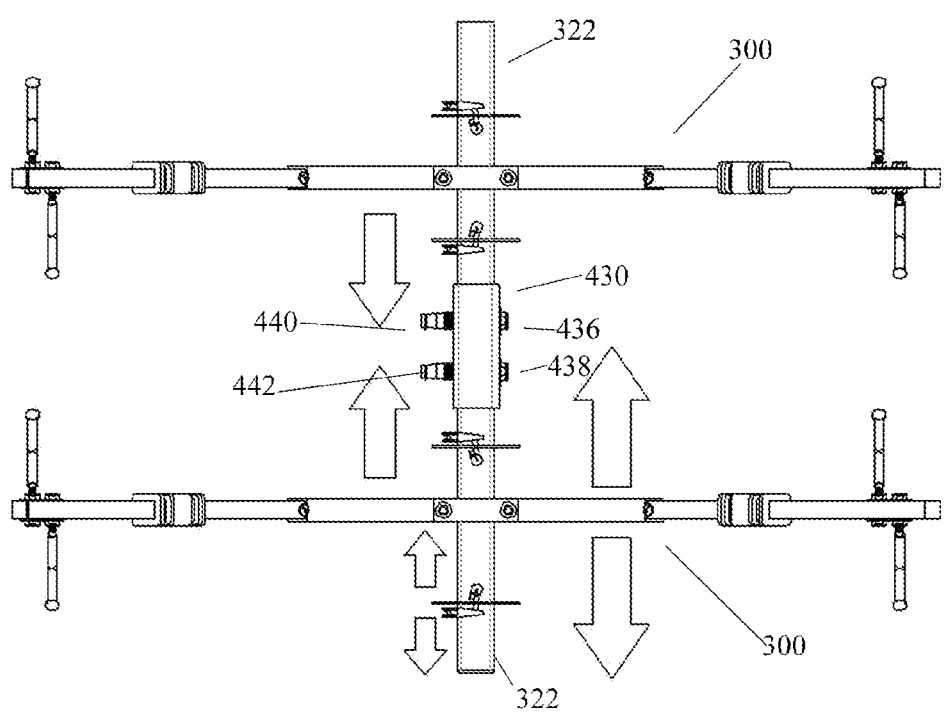
*Figure* 25

BICYCLE CARRIER

FIELD OF THE INVENTION

This invention relates to the field of vehicle mounted bicycle carriers.

BACKGROUND OF THE INVENTION

There are numerous bicycle carriers that mount to a vehicle for transporting bicycles from one location to another location. These carriers include roof-top mounted carriers, trunk mounted carriers and hitch mounted carriers. Roof-top carriers and trunk mounted carriers are primarily used for cars and other low profile vehicles. Hitch mounted carriers are popular with SUVs and other vehicles that have hitch attachments.

Hitch mounted carriers typically include a square bar or tube that slides into a receiver mounted on the vehicle. A pin engages the bar or tube in the receiver to secure the carrier to the vehicle. A vertical component is mounted onto the tube with horizontally extending arms onto which the bicycle is secured. These carriers are awkward to align and mount onto the vehicle. This type of carrier is also relatively heavy which also renders them difficult to mount onto the vehicle.

Also, these carriers are not adjustable, thus requiring different carriers for different types of bicycles, such as road bicycles and mountain bicycles. Also most current bicycle carriers are expensive ranging in price $150-$500.

Another problem with hitch mounted carriers is the use of the vehicle hitch receiver. Once the hitch mounted carrier is mounted to the hitch receiver, the vehicle may not be used for another use requiring the hitch receiver. Often it is necessary to use the hitch receiver for other purposes, such as towing a trailer. In that event, the hitch mounted carrier is not able to be used.

Many of the existing hitch mounted carriers also require partial disassembly of the bicycle for transport, such as removal of the front wheel. This is time consuming and requires securing the front wheel elsewhere on the carrier or vehicle.

A serious problem with hitch mounted bicycle carriers arise from damage to the bicycle being transported from the heat of the vehicle engine exhaust. Often the bicycle tires are adjacent to the vehicle engine exhaust which has considerable heat. This can result in the tires and bicycle components being damaged from this heat. Current bicycle carriers cannot be adjusted so that the bicycle is well clear of the exhaust tailpipe of different vehicles.

Thus a need exists for a lightweight, easily adjustable bicycle carrier for transporting bicycles between locations, one which avoids some or all of the above-described problems.

SUMMARY OF THE INVENTION

The present invention solves these and other problems by providing a lightweight bicycle carrier that is easily adjustable to accommodate a wide variety of sizes and shapes of bicycles and other equipment. The bicycle carrier of the present invention is easily assembled and installed onto the hitch receiver of a vehicle. The bicycle carrier can also be partially disassembled to allow access into the rear of the vehicle without interfering with the vehicle tailgate.

The bicycle carrier of a preferred embodiment of the present invention includes two angularly extending arm members. Bicycle supports are attached to the upper ends of the arm members to secure one or more bicycles to the bicycle carrier. The bicycle supports can be adjusted on the arm members to accommodate differing sizes and shapes of bicycle frames. The adjustment of bicycle supports along the angular orientation of the arm members allow differing heights and lengths of bicycle frames to be accommodated.

The bicycle carrier of a preferred embodiment includes arm members that are adjustable as well. The arm members telescope into and out of the mounting bracket of the bicycle carrier. Since the arm members extend at an angle relative to the mounting bracket, the adjustment of the length of the arm members will not only raise the height of the bicycle supports relative to the brackets but also change the distance between the bicycle supports.

Another preferred embodiment of the present invention includes arm members that are angularly adjustable relative to the mounting bracket. This angular adjustment of the arm members raises and lowers the bicycle supports as well as changing the distance between the bicycle supports. This enables various sizes of bicycle frames to be secured to the carrier. In one preferred embodiment, the arm members are infinitely adjustable while in another preferred embodiment the arm members are adjusted between selected positions.

The bracket of a preferred embodiment of the present invention can be attached to a shank that can be installed into a hitch receiver or clamped onto a trailer tongue or other surfaces of a vehicle or vehicle accessory. This enables the vehicle to be used with other accessories such as a trailer along with the bicycle carrier.

Another feature of a preferred embodiment of the present invention enables adjustment of the height of the arm members and bicycle clamps to enable the bicycle to be mounted well away from the heat of the vehicle tailpipe emissions.

Another preferred embodiment of the present invention includes a three point securing mechanism for securing the bicycle tightly to the bicycle carrier to prevent movement of the bicycle relative to the carrier.

The bicycle carrier system of another preferred embodiment enables multiple bicycle carriers to be mounted onto one another to add additional capacity. This embodiment includes extension shanks that connect bicycle carrier systems to one another.

These and other features of the present invention will be evident from the ensuing detailed description of preferred embodiments along with the drawings.

BRIEF DESCRIPTION OF THE DRAWINGS

FIG. 17 is a view of the carrier of another embodiment of the present invention.

FIG. 18 is a front view of a three point bicycle securing mechanism.

FIG. 19 is a close-up view of a lower bicycle securing mechanism of FIG. 18.

FIG. 20 is a view of bicycle secured by the three point bicycle securing mechanism of FIG. 18.

FIG. 21 is a perspective view of the bicycle securing mechanism of FIG. 18 and the carrier of FIG. 17.

FIG. 22 is a top view of the system of FIG. 18.

FIG. 25 is a top view of the system in FIG. 24.

DETAILED DESCRIPTION OF PREFERRED EMBODIMENTS

Figure 1:
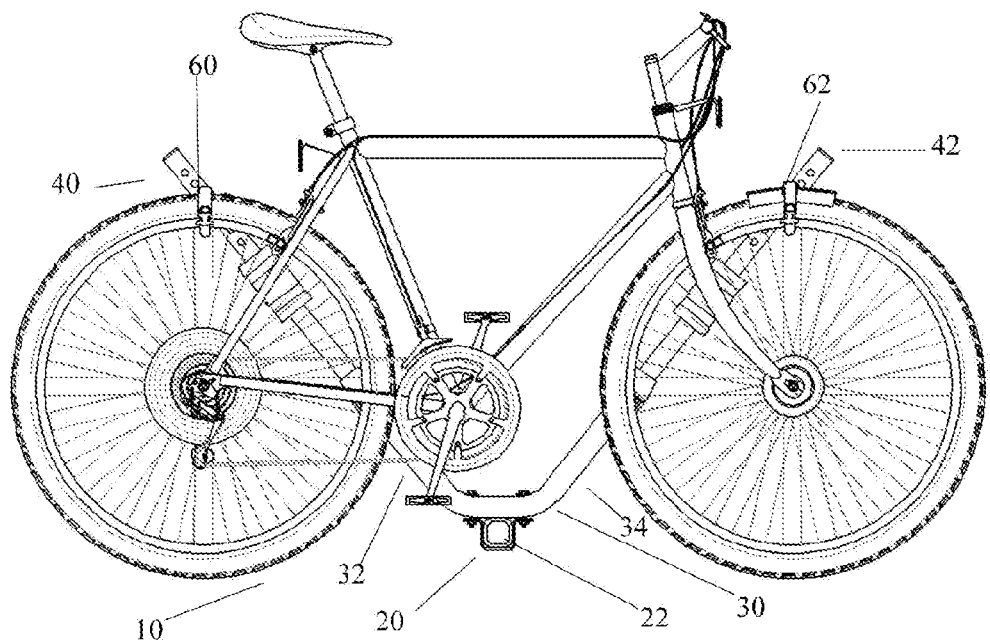
FIG. 1 is a front view of the bicycle carrier of a preferred embodiment of the present invention.
Figure 2:
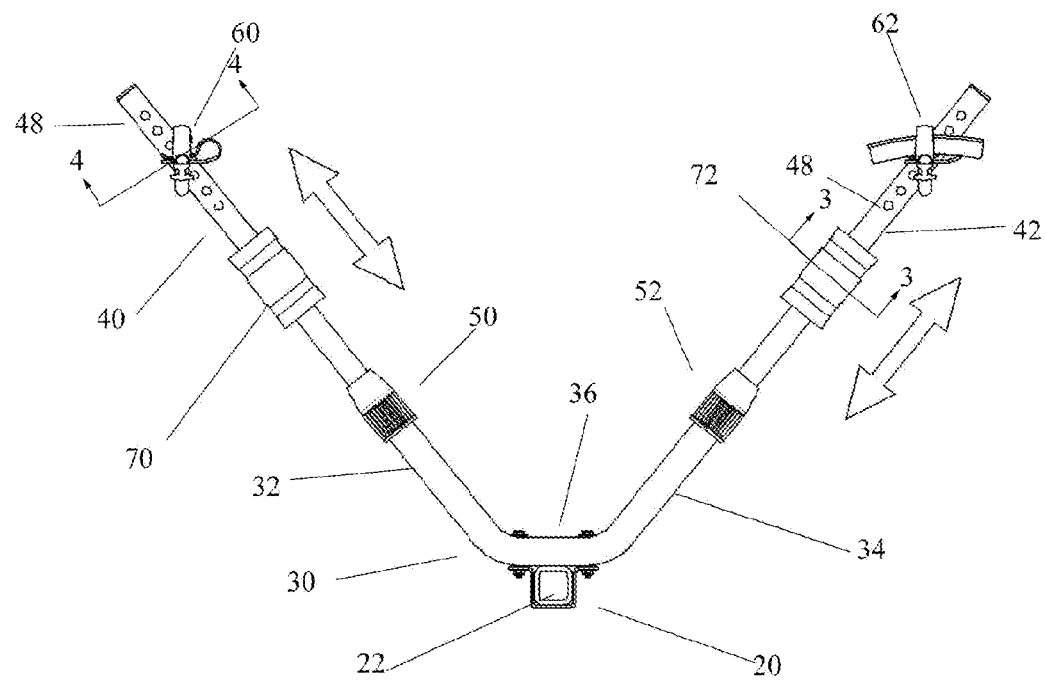
FIG. 2 is front view of the carrier of the embodiment of FIG. 1 without the bicycle.

The present invention provides a bicycle carrier for mounting to a vehicle. It is to be expressly understood that this exemplary embodiment is provided for descriptive purposes only and is not meant to unduly limit the scope of the present inventive concept. Other embodiments of the bicycle carriers and methods of use of the present invention are considered within the present inventive concept as set forth in the claims herein. For explanatory purposes only, the bicycle carriers of the preferred embodiments are discussed primarily for the purposes of understanding the scope of the present invention. It is to be expressly understood that other equipment carriers are contemplated under the present invention as well.

A preferred embodiment of the present invention is illustrated in FIGS. 1-6. This embodiment is intended for use with a vehicle having a hitch receiver. The typical hitch receiver receives a square tube or bar, usually in standard sizes of 2 inch or 1.25 inch. It is to be expressly understood that the present invention may be used with any size or type of hitch, receiver or other vehicle surface, as will be discussed in greater detail below.

The bicycle carrier 10 of this preferred embodiment includes a clamping mechanism 20, a bracket 30 and adjustable arm members 40. The clamping mechanism 20 can include a shank 22, which in this embodiment is an elongated length of square tube that is sized to be inserted into the hitch receiver of the vehicle. A clamp 24 is attached around the shank 22 or else it can be attached around another surface, such as a trailer tongue, a vehicle bumper or any other surface on the vehicle or on a trailer or accessory attached to the vehicle.

The clamp 24 is also attached to the bracket 30 by bolts, welding or any other attachment mechanism or formed integrally with the bracket 30. The bracket 30 in this preferred embodiment is a round tubular member but can also be a solid member, a plate or any other shape or configuration. In this preferred embodiment, the bracket 30 includes arms 32, 34 extending upwardly at an angle to the central portion 36 of the bracket. This angle ranges between zero and ninety degrees but preferably between thirty and sixty degrees. The angle is optimally selected to allow the maximum range of adjustability of the adjustable arm members to accommodate most sizes and shapes of bicycles.

The adjustable arm members 40, 42 are sized to slide within the tubular arms 32, 34. This allows the arm members to telescope within the tubular arms to adjust the extension of the arm members 40, 42. This allows not only adjustment of the bicycle carrier for differing heights of bicycles but also lengths of bicycles since the arm members are adjusting at an angle.

The adjustable arm members 40, 42 are secured from movement relative to the bracket 30 by locking mechanisms 50, 52. In this preferred embodiment, the locking mechanisms are cam, collets, or other clamping mechanisms. The clamping members 50, 52 rotate in one direction to apply pressure against the arm members 40, 42 to secure those members from movement. The clamping members are then rotated in the opposing direction to relieve the pressure against the arm members to allow the arm members to slide relative to the tubular arms 32, 34. Other locking mechanisms may be used as well, such as spaced holes in the arm members for receiving pins through the tubular arms 32, 34 and arm members 40, 42. Other locking mechanisms may be used as well.

Figure 3:
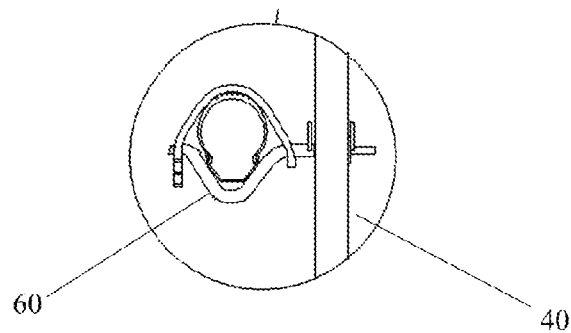
FIG. 3 is a cutaway view of a bicycle clamping mechanism taken along lines 3-3 of FIG. 2.

Bicycle clamping mechanisms 60, 62 are attached to the upper ends 44, 46 of the arm members 40, 42. These bicycle clamping mechanisms 60, 62 may clamp around the bicycle tires and wheels as shown in FIG. 3, or any other securing device. In this preferred embodiment, the bicycle clamping mechanisms are adjustable on the arm members 40, 42. A series of spaced holes 48 are formed on the upper ends of the arm members. The bicycle clamping mechanisms 60, 62 may be secured to any of these spaced holes 48 to add further adjustment to the bicycle carrier.

Figure 4:
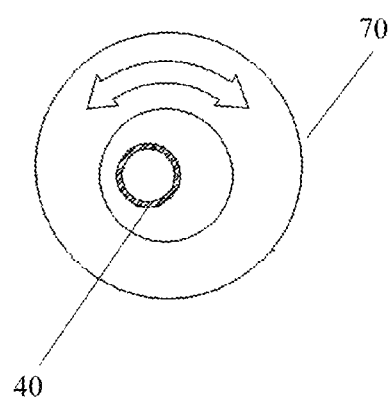
FIG. 4 is a cutaway view of the bumper mechanism taken along lines 4-4 of FIG. 2.
Figure 5:
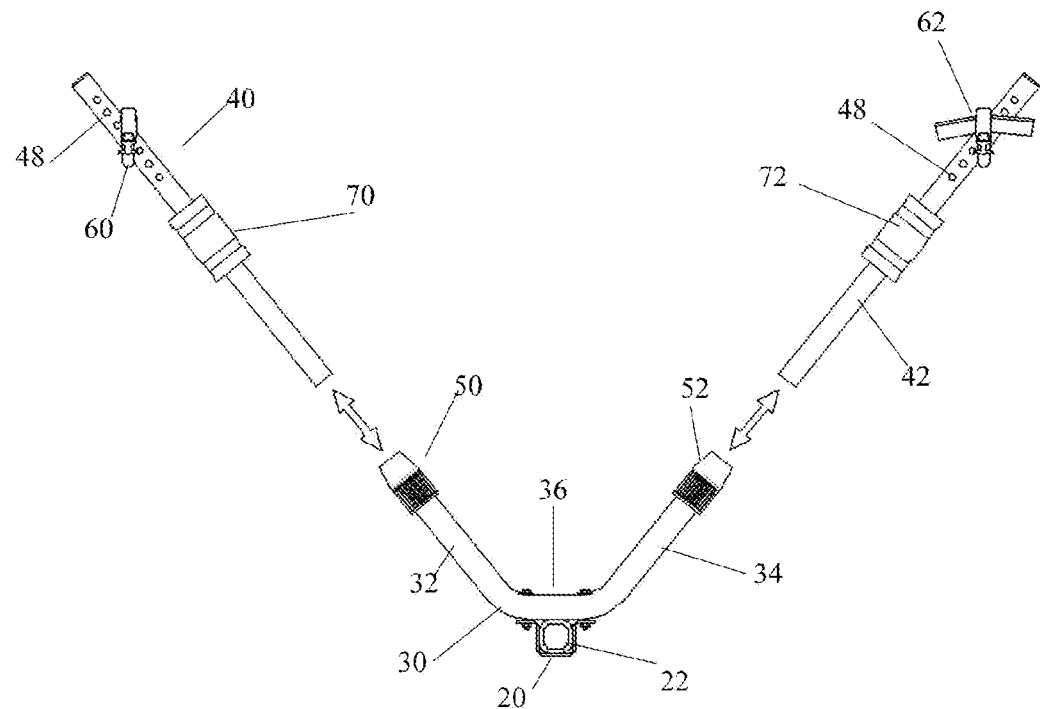
FIG. 5 is a partial assembly view of the carrier of the embodiment of FIG. 1.
Figure 6:
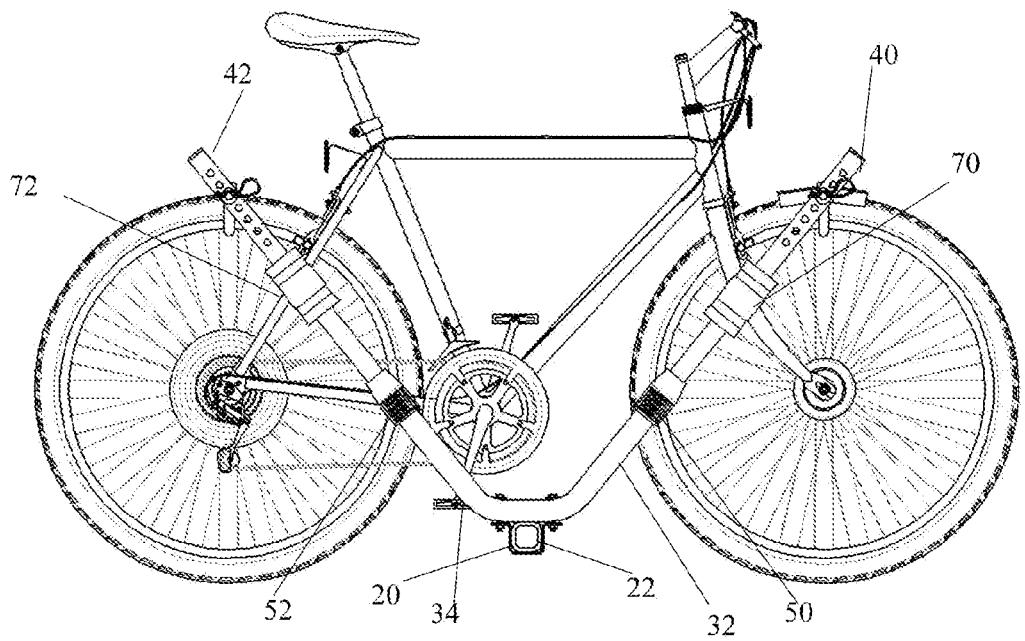
FIG. 6 is a rear view of the bicycle carrier of the embodiment of FIG. 1.
Figure 7:
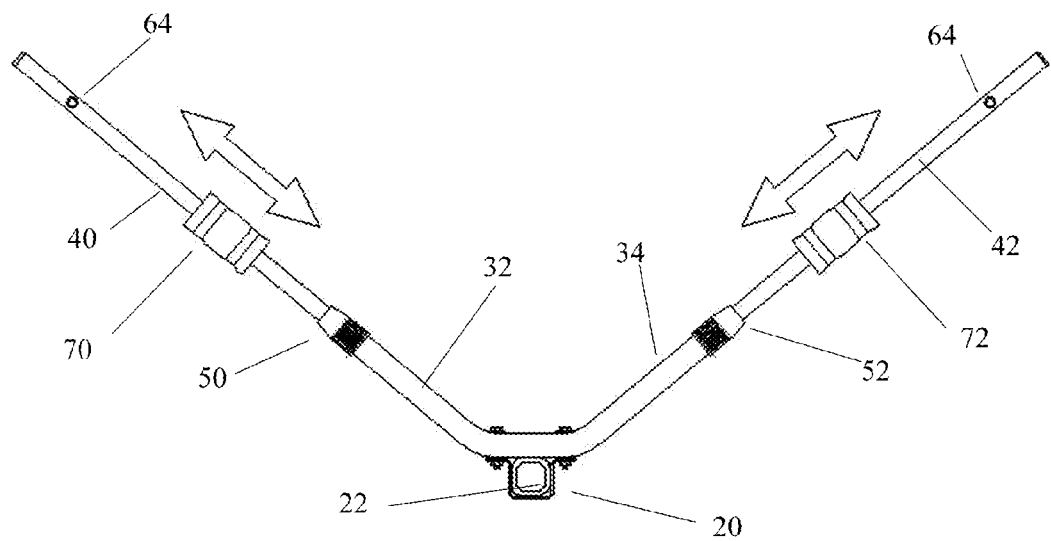
FIG. 7 is a front view of a bicycle carrier of another preferred embodiment.
Figure 8:
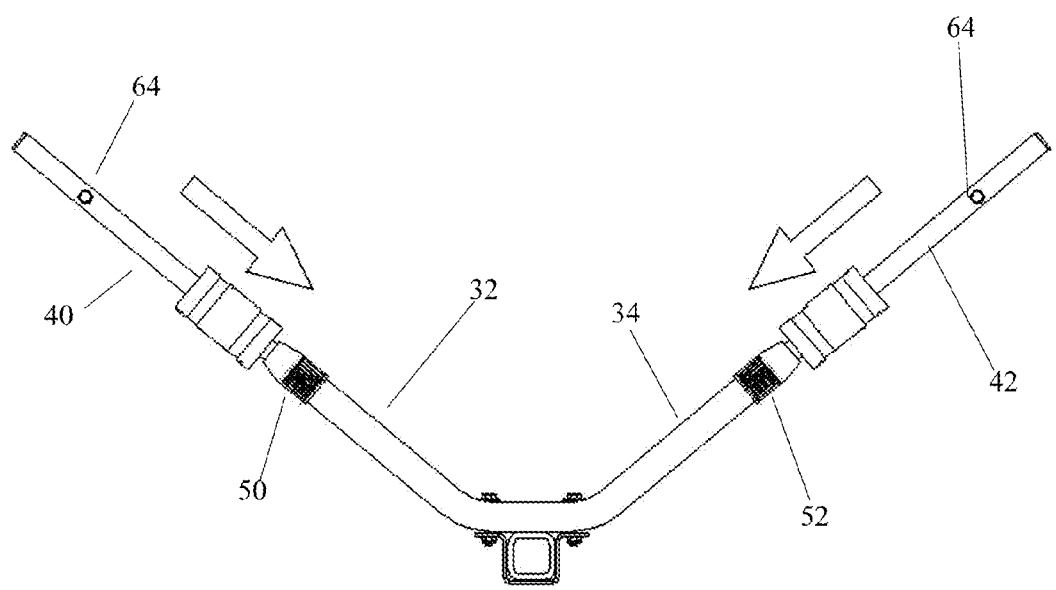
FIG. 8 is a view of the embodiment of FIG. 7 undergoing adjustment.
Figure 9:
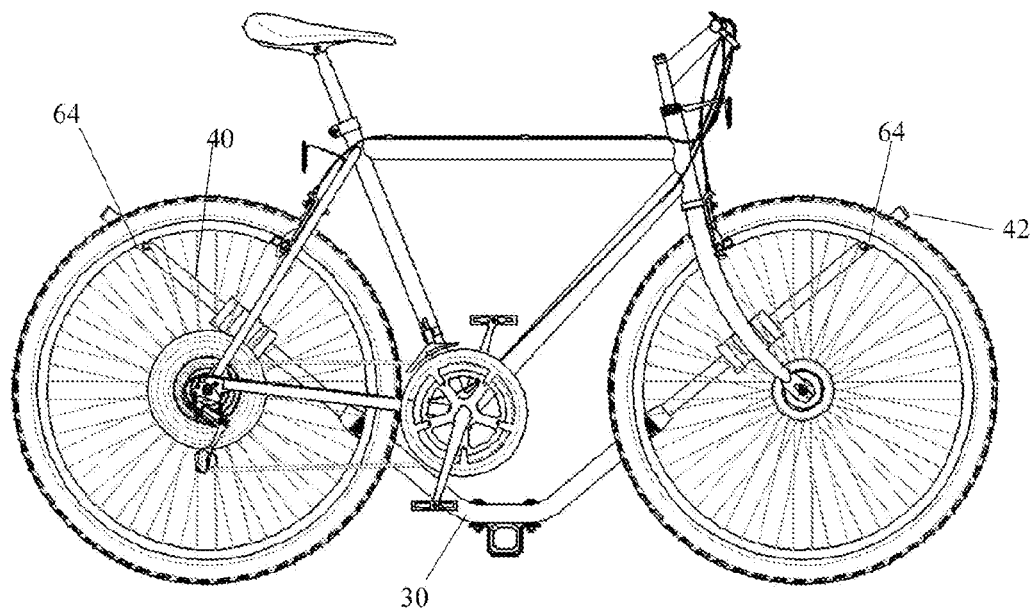
FIG. 9 is a front view of the carrier of the embodiment of FIG. 7 supporting a bicycle.
Figure 10:
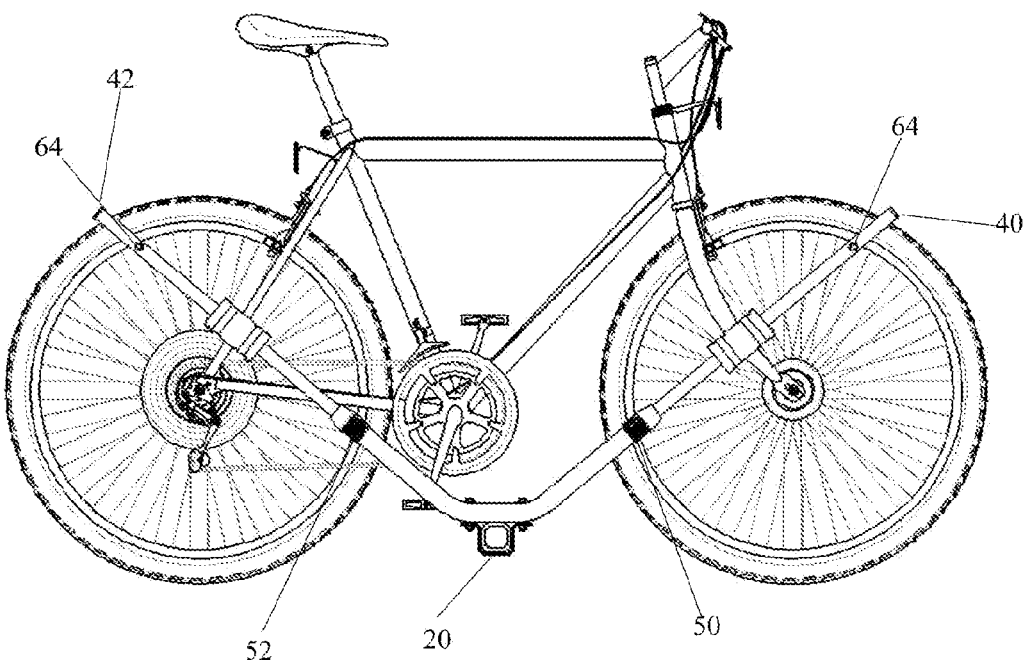
FIG. 10 is a rear view of FIG. 9.
Figure 11:
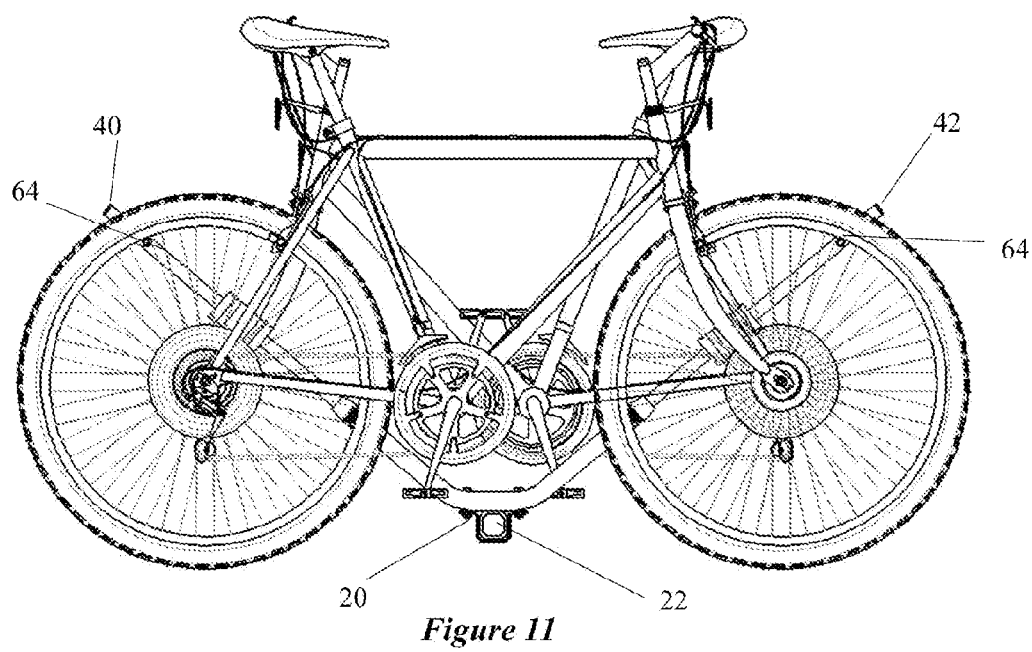
FIG. 11 is a view of the carrier of the embodiment of FIG. 7 supporting two bicycles.

Other features of this preferred embodiment are the bumpers 70, 72. These bumpers are formed of a resilient material to cushion the bicycle frame against the bicycle carrier. This minimizes scratching of the bicycle against the bicycle carrier. The bumpers are slidable on arm members 40, 42 to ensure that the bicycle frame will be protected regardless of the size and configuration of the bicycle. Another feature of a preferred embodiment of the present invention, as shown in FIG. 4, is the offset aperture on the bumpers 70, 72. The offset aperture is mounted onto the arm members 40, 42 so that the bumpers 70, 72 can be rotated to change the amount of material cushioning against the frame of the bicycle being carried. Since different frames may have different frame thickness, the bumpers may be adjusted to accommodate the different frames.

The bicycle carrier 10 of this preferred embodiment can be shipped in a knock down configuration for ease of shipping. The bracket 30 is clamped to the shank 22 by clamp 20. The adjustable arm members 40, 42 are slipped into the angular tubular members 32, 34 and clamped by locking mechanisms 50, 52 in the desired position. The bicycle clamping mechanisms 60, 62 and bumpers 70, 72 are attached at their desired positions as well. Additional bicycle clamping mechanisms can be attached to opposing sides of the arm members 40, 42 to allow an additional bicycle to be mounted on the carrier 10 as well.

The arm members 40, 42 and bicycle clamping mechanisms 60, 62 are easily adjustable to accommodate almost any size and shape of bicycle. The locking mechanisms 50, 52 allow ease of adjustment without the necessity of tools. The angular positioning of the arm members allows adjustment for not only the height of the bicycle but also the length of the bicycle frame.

The adjustability of the bicycle carrier system 10 also allows the carrier to be adjusted so that the bicycle being transported will be away from the vehicle tailpipe. This will reduce the damage that might occur to the bicycle from the heat of the tailpipe emissions.

The adjustable arm members 40, 42 can be easily removed to allow the height of the bicycle carrier to be reduced so that it is below the plane of the tailgate of the vehicle. Thus the bicycle carrier can remain mounted to the vehicle while allowing use of the vehicle tailgate. The arm members are easily reattached to the bicycle carrier when it is desired to transport bicycles.

Additional bicycle clamping mechanisms can be mounted on the opposing side of the bicycle carrier. This allows an additional bicycle to transported on the bicycle carrier.

Another preferred embodiment of the present invention is illustrated in FIGS. 7-11. This embodiment is similar to the above described embodiment except the bicycle clamping mechanism is replaced with short peg members 64 on each side of the adjustable arm members 40, 42. The arm members 40, 42 are easily adjusted as discussed above to allow for differing heights and lengths of bicycle frames. The bicycles are simply mounted onto the carrier 10 by securing the bicycle frames onto the peg members 64. Elastic cords or straps can be used to secure the bicycles on the carrier.

Another preferred embodiment is illustrated in FIGS. 12-15. The carrier 100 of this preferred embodiment also includes clamp 20 that is secured to shank 22 or trailer tongue or any other vehicle or accessory surface. Bracket 130 includes a cross member 132 that is attached to the clamp 20 by bolts, welding or any other attaching device. Plate member 134 is attached to the upper surface of the cross member 132. Arm members 140, 142 are secured to the plate member 134 by bolts 144, 146. The arm members 140, 142 are pivotal relative to the bracket 130 for angular adjustment. Bicycle supports 150, 152 are mounted to the upper end of the arm members 140, 142 and are adjustable to slide up and down the arm members. Clamping knobs 154, 156 are used to clamp the bicycle supports in the desired position. In this preferred embodiment, the bicycle supports 150, 152 are formed in U shaped hooks. It is to be expressly understood that other types of bicycle supports or clamping mechanisms may be used as well with this embodiment.

Figure 12:
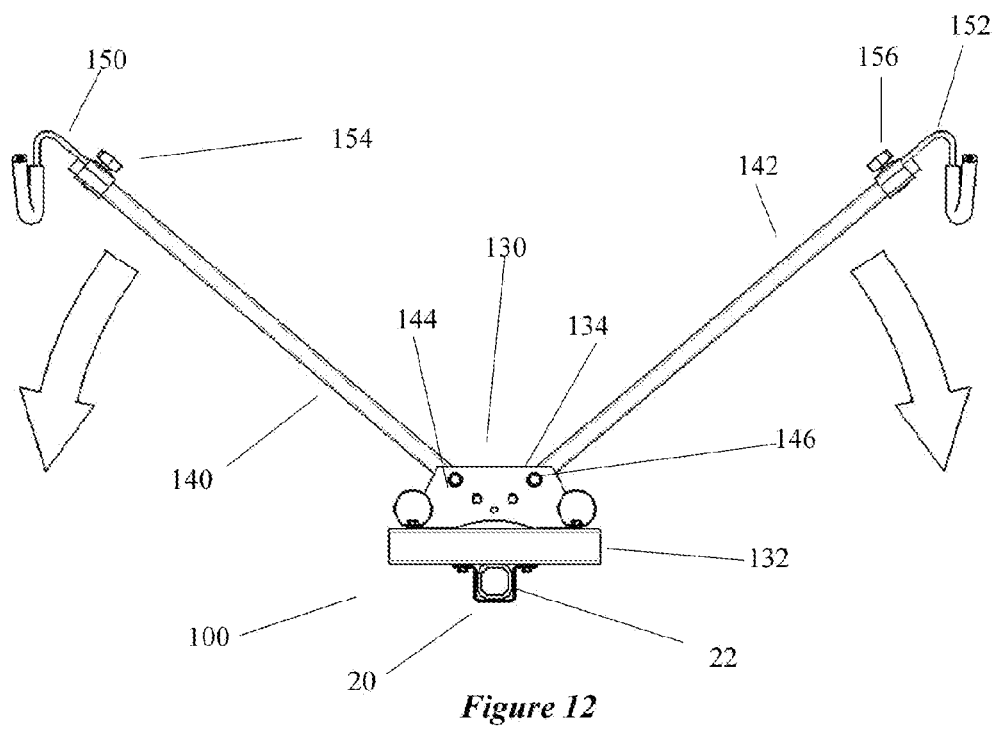
FIG. 12 is a front view of a bicycle carrier of another preferred embodiment.
Figure 13:
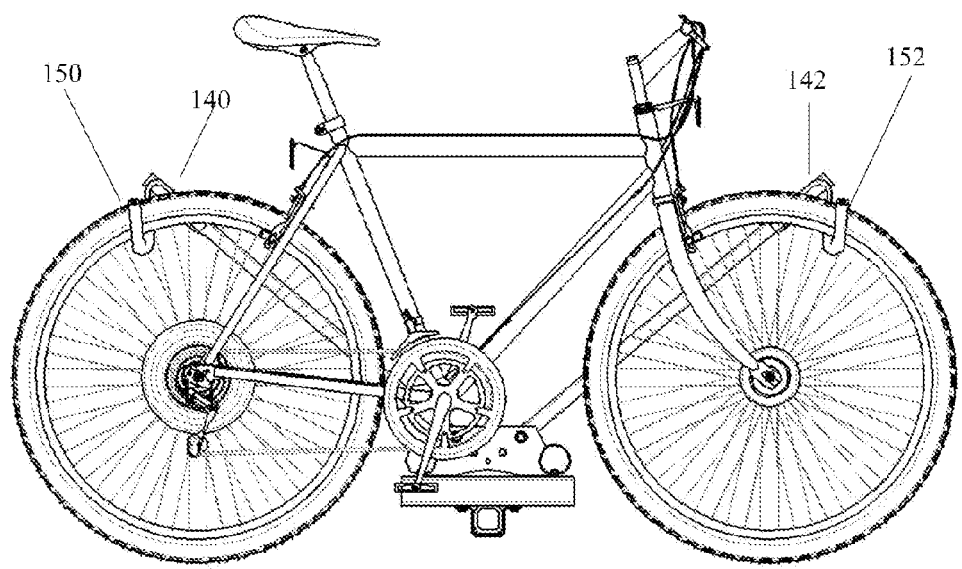
FIG. 13 is a view of the carrier of the embodiment of FIG. 12 supporting a bicycle.
Figure 14:
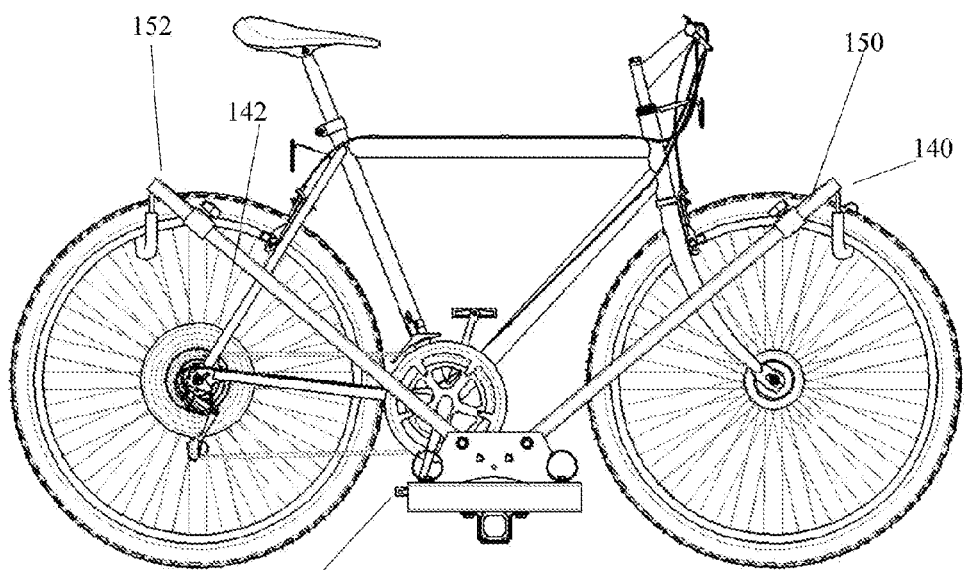
FIG. 14 is a rear view of the carrier of the embodiment of FIG. 12 supporting a bicycle.

The bicycle wheels are placed onto the bicycle supports 150, 152. The pivotal action of the arm members allow the differing sizes of bicycle frames to be easily supported. As the arm members pivot downward, as shown in FIGS. 12-14, the bicycle supports 150, 152 are extended further apart. The additional adjustment of the bicycle supports on the arm members provides further adjustment for differing sizes of frames.

Figure 15:
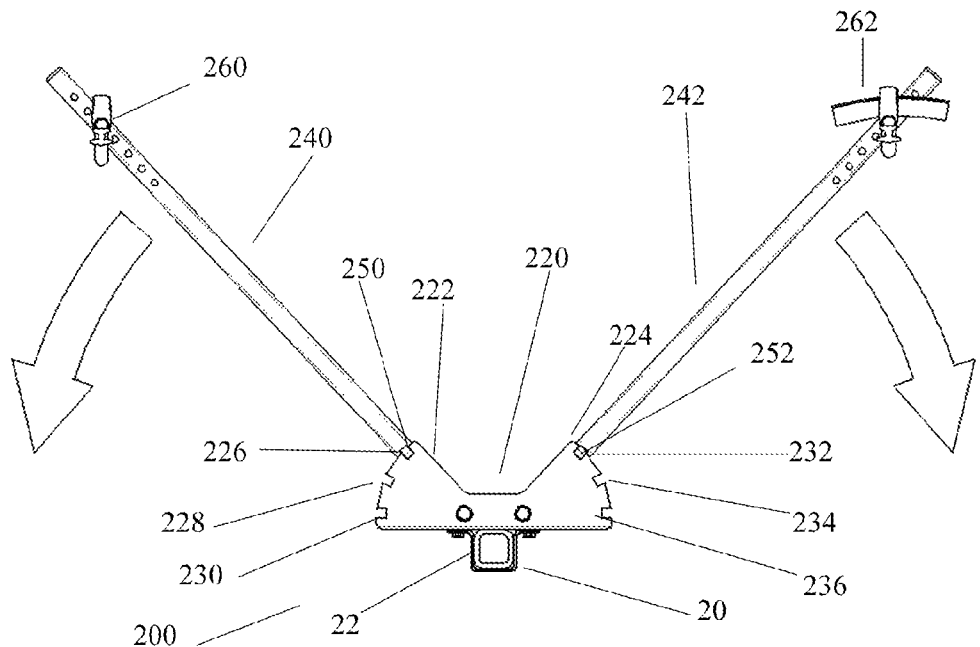
FIG. 15 is a front view of a bicycle carrier of another preferred embodiment.
Figure 16:
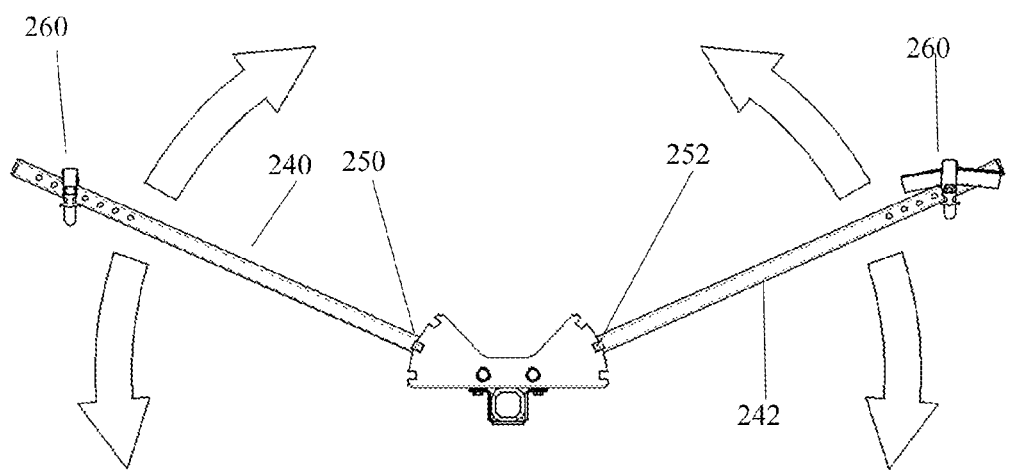
FIG. 16 is a view of the carrier of the embodiment of FIG. 15 in another adjusted position.

Another preferred embodiment of the present invention is illustrated in FIGS. 15-16. The bicycle carrier 200 of this embodiment also uses clamp 20 and shank 22 as discussed above. Bracket 220 of this carrier includes wing portions 222, 224 extending on each side of bracket 220. Notches 226, 228, 230, 232, 234, 236 are formed in wing portions 222, 224. Additional notches may be provided as well. Arm members 240, 242 are pivotally mounted to the bracket 220 to pivot upward and downward in a vertical plane relative to the bracket 220. Detents 250, 252 are spring mounted on arm members 240, 242. It is to be expressly understood that the detents can be removable or otherwise mounted to the arm members to engage and disengage from the notches in the wing portions 222, 224.

Bicycle clamping mechanisms 260, 262 are adjustably mounted to the upper ends of the arm members 240, 242. The position of the bicycle clamping mechanisms can be changed to adjust for different sizes of bicycle frames.

In use, the detents 250, 252 are released from notches to allow the arm members to pivot upward or downward to adjust the distance between the bicycle clamping mechanisms. As shown in FIGS. 15, 16, the arm members 240, 242 are pivoted to the desired position and the bicycle clamping mechanisms 260, 262 are adjusted to the desired position. The bicycle is then secured to the carrier 200 by the clamping mechanisms 250, 252.

Another preferred embodiment of the present invention is illustrated in FIGS. 17-18. The bicycle carrier 300 of this preferred embodiment is similar to the above descriptions. Bracket 330 is secured to shank 322 by clamp 320. The bracket 330 includes base member 332 with angular extending arms 334, 336. Adjustable arm members 340, 342 telescope within the angular extending arms 334, 336. The adjustable arm members 340, 342 are secured relative to arms 334, 336 by pins 344, 346. The adjustable arm members include a series of spaced holes for receiving pins 344, 346 so that the length of the arm members can be adjusted. The carrier also includes bicycle clamping mechanisms 362, 364 and bumpers 370, 372 similar to the bicycle clamping mechanism and bumpers discussed in earlier embodiments.

Figure 23:
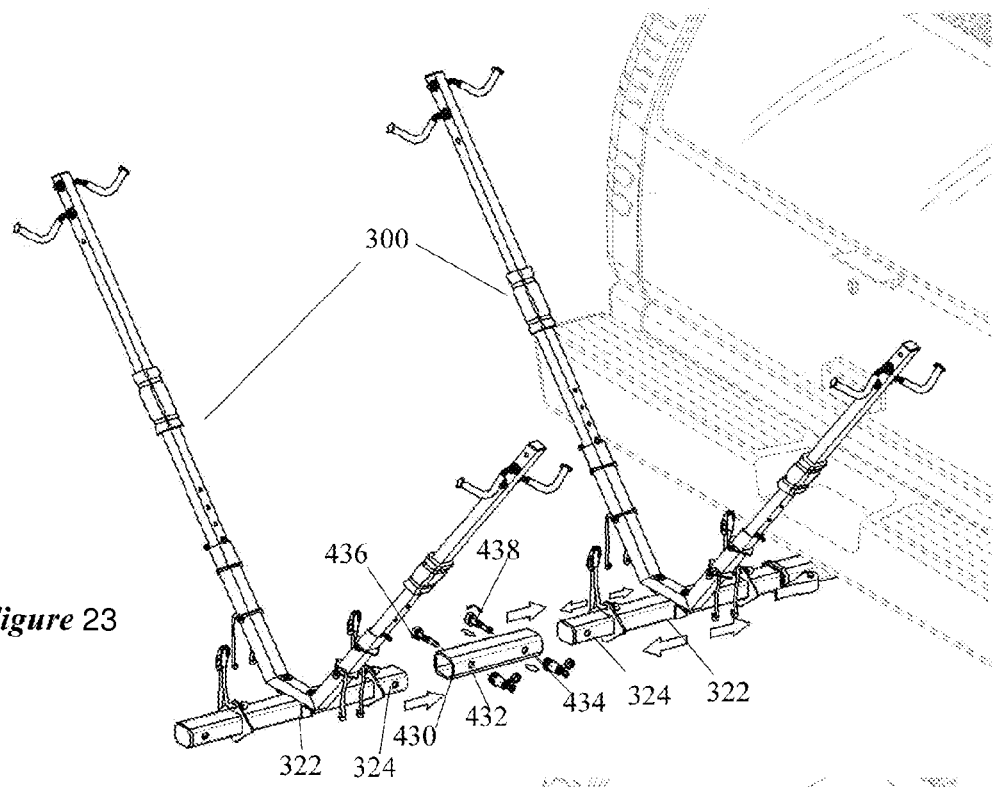
FIG. 23 is an exploded perspective view of an extended bicycle carrier system.
Figure 24:
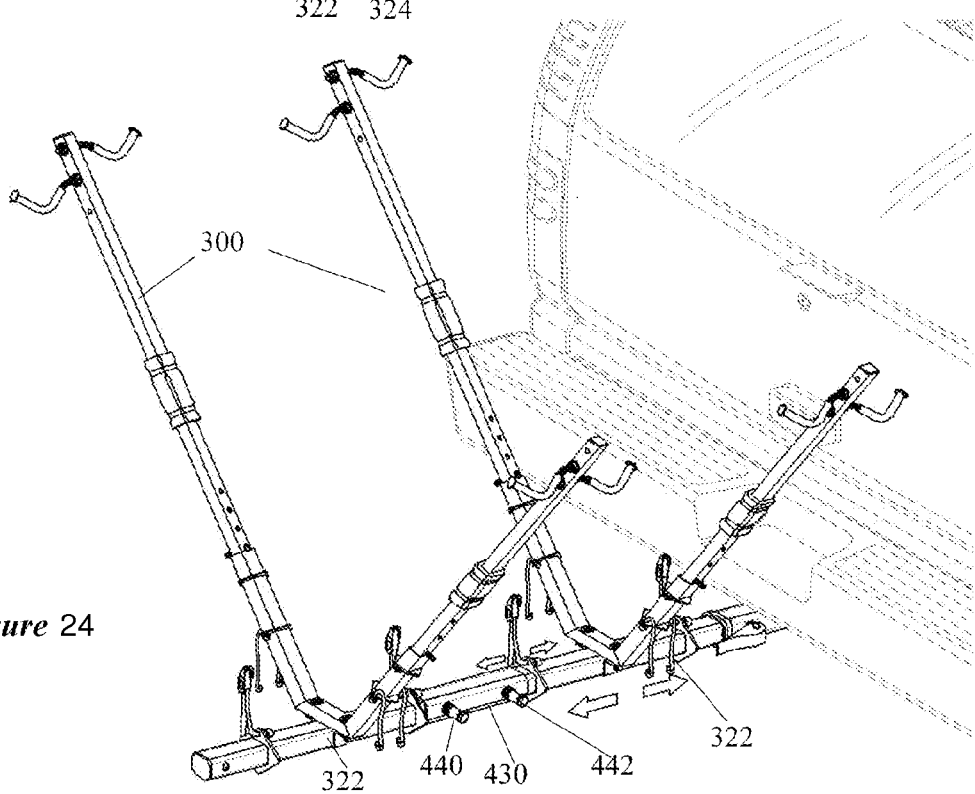
FIG. 24 is a perspective view of the an extended bicycle carrier system.

Another preferred embodiment of the present invention includes innovative bicycle securing mechanism. One embodiment of these bicycle securing mechanisms are disclosed in FIGS. 18-25. Lower bicycle securing mechanism 400, as shown in FIGS. 23, 24 secure the lower portion of the bicycle to the bicycle carrier. Lower bicycle securing mechanism 400 includes collar 402 that slides onto the shank 322. The collar may be loose on the shank, secured to the shank or even mounted onto the bracket 330. Elastic cord 404 is attached to the collar 402 through holes formed in the collar. Hook member 406 is attached to the elastic cord 404. The hook member 406 engages over the pedal stem of the bicycle to hold the lower portion of the bicycle securely to the carrier 300. The length of the elastic cord is such that there is tension in the cord when the hook member engages the pedal stem. An additional securing mechanism 400 can be installed on the opposing side of the carrier to secure an additional bicycle.

Bicycle wheel securing mechanisms 410, 420 secure the wheels of the bicycle to the carrier to prevent them from articulating relative to the carrier. The securing mechanisms 410, 420 include collars 412, 414, 422, 424 mounted onto angled arm members 334, 336. These collars may be loose or secured to the angled arm members. Elastic cords 416, 426 are secured to the lower collars 412, 422 respectively. Once the bicycle is mounted onto the carrier 300, the cords 416, 426 are secured over the bicycle wheels and engaged with the upper collars 414, 424. This prevents the wheels from articulating relative to the bicycle carrier during transport.

While the bicycle securing mechanisms were discussed with the bicycle carrier embodiment 300, it is to be expressly understood that these mechanisms may be used with any type of bicycle carrier such as those described above and with other embodiments as well.

As shown in FIGS. 21-22, the bicycle carrier 300 may be easily adjusted along the length of the shank 322. This enables the carrier to be fitted to any particular vehicle configuration. For instance, some SUVs include a tailgate mounted spare tire while others do not. The carrier can be adjusted to accommodate either situation. Also, the collars for the lower bicycle securing mechanism can also be easily adjusted. Further, the bicycle securing mechanisms that are discussed above can be mounted on both sides of the bicycle carrier to allow two bicycles to be carried.

Another preferred embodiment of the present invention is illustrated in FIGS. 23-25. This preferred embodiment includes the carrier system 300 as discussed above. The carrier of this embodiment also includes an extension shank 430. The extension shank includes two spaced holes 432, 434 extending crosswise through the shank 430. Pins 436, 438 are insertable through the holes 432, 434 with locks 440, 442. The extension shank 430 engages over shank 322 of carrier 300 with pin 436 is insertable into hole 432 that is aligned with hole 324 on shank 322. It is to be noted that the extension shank 430 can also be sized to slide within shank 322. The pins 436, 438 may be bolts or preferably securing pins with resilient inner nuts as disclosed in U.S. Pat. No. 6,609,725, incorporated herein by reference.

A second bicycle carrier system 300 is then mounted to extension shank 430. The shank 322 of the second carrier 300 slides into or over extension shank 430 until hole 324 is aligned with hole 434. Pin 438 is inserted through the holes to secure the shanks to one another. Thus, two bicycle carrier systems can be mounted to a vehicle that can carry up to four bicycles. Additional extension shanks can be used to add even more bicycle carrier systems to the vehicle.

While the extension shanks 430 were discussed with the bicycle carrier embodiment 300, it is to be expressly understood that these extension shanks may be used with any type of bicycle carrier such as those described above and with other embodiments as well.

It is to be expressly understood that other embodiments are considered to be within the scope of the present invention as set forth in the claims. For example, the carrier systems may be used with a single or dual shank carrier system such as those disclosed in U.S. patent application Ser. No. 09683820 incorporated herein by reference. Also, the carrier could be mounted on other vehicle surfaces other than the hitch. For example the adjustable bicycle carrier system could be secured to a vehicle roof surface, a cargo bed, a trunk lid surface or other vehicle or trailer surface.

What is claimed is:

1. A bicycle carrier in combination with at least one bicycle by attachment to wheels of said bicycle, wherein said bicycle carrier comprises:
   a clamping mechanism for attachment to a vehicle, wherein the clamping mechanism supports the bicycle carrier;
   a bracket attached to said clamping mechanism;
   a first arm and a second arm, each of which is mounted to the bracket such that the first arm and the second arm extend upwardly in different directions, wherein the first arm and the second arm extend upwardly from different positions on the bracket, wherein the first arm, the second arm, and the bracket form a substantially V-shaped arrangement located above the clamping mechanism;
   a first bicycle wheel cradle and a second bicycle wheel cradle, each of which is adjustably mounted to the first arm and the second arm, respectively, for supporting a bicycle from a first wheel of the bicycle and a second wheel of the bicycle where said cradles contact said bicycle wheels at approximately a 12 o'clock position such that the bicycle is maintained in an upright position, wherein the first bicycle wheel cradle and the second bicycle wheel cradle are adjustable along each length of the first arm and the second arm, such that the first bicycle wheel cradle and the second bicycle wheel cradle are adjustable in both an X and a Y direction such that the cradles are moveable and adjustable relative to said arms in multiple fixed positions up and down the length of said arms.

2. The bicycle carrier of claim 1, wherein the first arm and the second arm have a first side and a second side, wherein the first bicycle wheel cradle is disposed on the first side of the first arm, wherein the second bicycle wheel cradle is disposed on the first side of the second arm, and whereby the first bicycle wheel cradle and the second bicycle wheel cradle provide a capability to support the bicycle.

3. The bicycle carrier of claim 2, further comprising:
   a third bicycle wheel cradle and a fourth bicycle wheel cradle,
      wherein the third bicycle wheel cradle and the fourth bicycle wheel cradle are adjustable along each length of the first arm and the second arm such that the third bicycle wheel cradle and the fourth bicycle wheel cradle are adjustable in both the X and the Y direction,
      wherein the third bicycle wheel cradle and the fourth bicycle wheel cradle receive a first wheel and a second wheel, respectively, of a second bicycle,
      wherein the third bicycle wheel cradle and the fourth bicycle wheel cradle support a total weight of the second bicycle in the upright position, and
      wherein the third bicycle wheel cradle and the fourth bicycle wheel cradle are adapted for fitting between a pair of spokes of the first wheel and the second wheel of the second bicycle.

4. The bicycle carrier of claim 3, further comprising:
   a third clamping mechanism and a fourth clamping mechanism,
      wherein the third clamping mechanism and the fourth clamping mechanism are attached to the third bicycle wheel cradle and the fourth bicycle wheel cradle, respectively, and
      wherein the third clamping mechanism and the fourth clamping mechanism secure the first wheel and the second wheel of the second bicycle, respectively, to the third bicycle wheel cradle and the fourth bicycle wheel cradle, respectively.

5. The bicycle carrier of claim 4, wherein the first arm and the second arm have a first side and a second side, wherein the third bicycle wheel cradle is disposed on the second side of the first arm, wherein the fourth bicycle wheel cradle is disposed on the second side of the second arm, and whereby the third bicycle wheel cradle and the fourth bicycle wheel cradle provide a capability to support the second bicycle.

6. The bicycle carrier of claim 1 wherein said bicycle carrier further comprises:
   telescoping arms slidably mounted into the first arm and the second arm; and a locking mechanism for securing said telescoping arms from movement relative to the first arm and the second arm.

7. The bicycle carrier of claim 6 wherein said locking mechanism comprises:
   an eccentric cam locking mechanism.

8. The bicycle carrier of claim 6, wherein said mechanism comprises:
   a pin locking mechanism.

9. The bicycle carrier of claim 1, wherein the first arm and the second arm comprises:
   a mounting mechanism for securing the first arm and the second arm to said bracket to allow the first arm and the second arm to be independently, pivotally adjustable to change one or more angular positions of the first arm and the second arm relative to said bracket.

10. The bicycle carrier of claim 9, wherein said mounting mechanism comprises:
an infinitely adjustable mounting mechanism for allowing the first arm and the second arm to be adjusted between zero and ninety degrees relative to said bracket.

11. The bicycle carrier of claim 9 wherein said mounting mechanism comprises:
one or more adjustable mounting mechanisms for allowing the first arm and the second arm to be adjusted among pre-selected positions relative to said bracket.

12. The bicycle carrier of claim 1, wherein said bicycle carrier further comprises:
said first bicycle wheel cradle is attached to a first collar mounted to the first arm where said first collar is moveable along said first arm;
said second bicycle wheel cradle is attached to a second collar mounted to the second arm where said second collar is moveable along said second arm; and
an elastic cord mounted to said first collar that is then stretched over the first wheel of said bicycle and engaged to one of the first collar and the second collar in order to prevent the first wheel from articulating relative to said bicycle carrier.

13. The bicycle carrier of claim 12, further comprising another elastic cord mounted to said second collar that is then stretched over the second wheel of said bicycle and engaged to one of the first collar and the second collar in order to prevent the second wheel from articulating relative to said bicycle carrier.

14. The bicycle carrier of claim 1, wherein said clamping mechanism comprises:
an elongated tube for insertion into a hitch receiver of a vehicle; and a clamp securing said bracket to said elongated tube.

15. The bicycle carrier of claim 1, wherein said clamping mechanism comprises:
a clamp for attaching said bracket to a tongue of a trailer.

16. The bicycle carrier of claim 1, wherein said clamping mechanism comprises:
a clamp for attaching said bracket to a vehicle attachment.

17. The bicycle carrier of claim 1, wherein said bicycle carrier further comprises:
a bumper for cushioning the bicycle from movement against said bicycle carrier.

18. The bicycle carrier of claim 1, wherein said bicycle carrier further comprises:
a bumper mounted on an eccentric axis around the first arm and the second arm in order to provide adjustable cushioning for said bicycle secured to said bicycle carrier.

19. The bicycle carrier of claim 1, further comprising one or more adjustment mechanisms for adjusting positions of the first bicycle wheel cradle and the second bicycle wheel cradle relative to the first arm and the second arm.

20. The bicycle carrier of claim 1 wherein said bicycle carrier further comprises:
a lower bicycle securing mechanism adapted to secure a pedal of said bicycle to prevent said bicycle from articulating relative to the bicycle carrier.

21. The bicycle carrier of claim 1, wherein the lower bicycle securing mechanism further comprises:
a collar mounted to said bicycle carrier;
an elastic cord mounted to said collar; and
an engaging member on said elastic cord for securing said bicycle to said bicycle carrier.

22. The bicycle carrier of claim 1, further comprising:
at least a first securing mechanism and a second securing mechanism attached to the first bicycle wheel cradle and the second bicycle wheel cradle, respectively,
wherein the at least the first securing mechanism and the second securing mechanism secure the first wheel and the second wheel of said bicycle, respectively, to the first bicycle wheel cradle and the second bicycle wheel cradle, respectively.

23. A bicycle carrier, in combination with at least one bicycle by attachment to wheels of said bicycle, wherein said bicycle carrier comprises:
a shank for insertion into a hitch receiver;
a bracket, wherein the shank is secured to the bracket;
a first arm and a second arm, each of which is mounted to the bracket such that the first arm and the second arm extend upwardly in different directions, wherein the first arm and the second arm extend upwardly from different positions on the bracket, and, thereby, the first arm, the second arm, and the bracket form a substantially V-shaped arrangement located above the shank;
a bicycle wheel, adjustable, clamping mechanism, which is adjustably mounted to each of said first arm and said second arm, wherein the bicycle wheel, adjustable, clamping mechanism supports a bicycle from a wheel of the bicycle at an approximately 12 o'clock position on said wheel such that the bicycle is maintained in an upright position,
wherein said bicycle wheel, adjustable, clamping mechanism is adjustable along each length of the first arm and the second arm such that said bicycle wheel, adjustable, clamping mechanism is adjustable in both an X and a Y direction such that the cradles are moveable and adjustable relative to said arms in multiple fixed positions up and down the length of said arms; and
a lower bicycle securing mechanism disposed on the shank, the lower bicycle securing mechanism adapted to secure a pedal of said bicycle to prevent said bicycle from articulating relative to the bicycle carrier.

24. A bicycle carrier in combination with at least one bicycle by attachment to wheels of said bicycle, wherein said bicycle carrier comprises:
a clamping mechanism for attachment to a vehicle, wherein the clamping mechanism supports the bicycle carrier;
a bracket attached to the clamping mechanism;
a first arm and a second arm, each of which is mounted to the bracket such that the first arm and the second arm extend upwardly in different directions, wherein the first arm and the second arm extend upwardly from different positions on the bracket, wherein the different positions extend in the different directions from a center portion of the bracket, and, thereby, the first arm, the second arm, and the bracket form a substantially V-shaped arrangement located above the clamping mechanism;
a first bicycle wheel cradle and a second bicycle wheel cradle, each of which is adjustably mounted to the first arm and the second arm, respectively, for supporting a bicycle from a first wheel of the bicycle and a second wheel of the bicycle such that the bicycle is maintained in an upright position,
wherein the first bicycle wheel cradle and the second bicycle wheel cradle are adjustable along each length of the first arm and the second arm, such that the first bicycle wheel cradle and the second bicycle wheel cradle are adjustable in both an X and a Y direction such that the cradles are moveable and adjustable relative to said arms in multiple fixed positions up and down the length of said arms;

a first clamping mechanism and a second clamping mechanism attached to the first bicycle wheel cradle and the second bicycle wheel cradle, respectively, wherein the first clamping mechanism and the second clamping mechanism secure the first wheel and the second wheel of said bicycle, respectively, to the first bicycle wheel cradle and the second bicycle wheel cradle, respectively such that said cradles contact said bicycle wheels at approximately a 12 o'clock position; and a lower bicycle securing mechanism adapted to secure a pedal of said bicycle to prevent said bicycle from articulating relative to the bicycle carrier.

* * * * *